United States Patent
Floch et al.

(10) Patent No.: US 8,660,166 B2
(45) Date of Patent: Feb. 25, 2014

(54) METHOD FOR SYNCHRONIZING A RECEIVER WITH A RECEIVED AMBIGUOUS SIGNAL HAVING A KNOWN NUMBER OF AT LEAST TWO PEAKS

(75) Inventors: Jean-Jacques Floch, Munich (DE); Francis Soualle, Munich (DE)

(73) Assignee: Astrium GmbH, Taufkirchen (DE)

( * ) Notice: Subject to any disclaimer, the term of this patent is extended or adjusted under 35 U.S.C. 154(b) by 72 days.

(21) Appl. No.: 13/312,505

(22) Filed: Dec. 6, 2011

(65) Prior Publication Data
US 2012/0140857 A1   Jun. 7, 2012

(30) Foreign Application Priority Data
Dec. 7, 2010   (EP) ..................................... 10015382

(51) Int. Cl.
*H04B 1/00* (2006.01)
(52) U.S. Cl.
USPC ........... 375/142; 375/150; 375/343; 375/354; 370/503
(58) Field of Classification Search
USPC ......... 375/140, 142, 143, 150, 152, 343, 354, 375/362, 365, 366, 368; 370/503, 509, 510, 370/512–515
See application file for complete search history.

(56) References Cited

U.S. PATENT DOCUMENTS

| | | | |
|---|---|---|---|
| 5,689,271 A * | 11/1997 | Lennen ..................... | 342/357.69 |
| 6,987,820 B1 * | 1/2006 | Brenner ........................ | 375/343 |
| 7,205,935 B2 * | 4/2007 | Sleewaegen ............. | 342/357.61 |
| 7,555,033 B2 | 6/2009 | Lillo et al. | |
| 2002/0015439 A1 * | 2/2002 | Kohli et al. .................... | 375/148 |
| 2007/0242733 A1 | 10/2007 | Monnerat | |
| 2010/0124255 A1 * | 5/2010 | Riley ........................... | 375/150 |

OTHER PUBLICATIONS

Jyh-Ching, "A Multi-Objective Approach in GNSS Code Discriminator Design", Position, Location, and Navigation Symposium, 2006, IEEE/ION, Coronado, California, Apr. 25-27, 2006, XP010924864, pp. 223-234.
David Fernandez, "A robust bias detection method in the frequency domain for code delay estimation applied to modern navigation modulations," Position, Location, Navigation Symposium (PLANS), 2010 IEEE/ION, May 4, 2010, XP031707230, pp. 428-435.
European Office action conducted in counterpart European Appln. No. 10 015 382.4-1812 (Mar. 15, 2013).

* cited by examiner

*Primary Examiner* — Dac Ha
(74) *Attorney, Agent, or Firm* — Greenblum & Bernstein, P.L.C.

(57) ABSTRACT

Method and receiver synchronizing receiver with received ambiguous signal having at least two peaks. Method includes providing information about known transmitted signal having a number of at least two peaks, the information including number of peaks and distances between at least two peaks, determining ratios between peaks of known transmitted signal and assigning determined ratio value to each peak, and deducing theoretical auto-correlation function from known transmitted signal. Auto-correlation function has number of correlations corresponding to number of peaks in known transmitted signal and correlators of the auto-correlation function are provided in same distance and have the same relative ratio as peaks in known transmitted signal. Further includes tracking received signal with auto-correlation function so that correlator pattern of auto-correlation function is aligned with peak pattern of received signal by assigning each peak of the received signal to a correlator of the auto-correlation function, and identifying each peak.

5 Claims, 3 Drawing Sheets

|   | 0 | 1 | 2 | 3 | 4 | 5 | 6 | 7 | 8 |
|---|---|---|---|---|---|---|---|---|---|
| 0 | 1 | -5/4 | -5/4 | 5/3 | 5/3 | -5/2 | -5/2 | 5 | 5 |
| 1 | -4/5 | 1 | 1 | -4/3 | -4/3 | 2 | 2 | -4 | -4 |
| 2 | -4/5 | 1 | 1 | -4/3 | -4/3 | 2 | 2 | -4 | -4 |
| 3 | 3/5 | -3/4 | -3/4 | 1 | 1 | -3/2 | -3/2 | 3 | 3 |
| 4 | 3/5 | -3/4 | -3/4 | 1 | 1 | -3/2 | -3/2 | 3 | 3 |
| 5 | -2/5 | 1/2 | 1/2 | -2/3 | -2/3 | 1 | 1 | -2 | -2 |
| 6 | -2/5 | 1/2 | 1/2 | -2/3 | -2/3 | 1 | 1 | -2 | -2 |
| 7 | 1/5 | -1/4 | -1/4 | 1/3 | 1/3 | -1/2 | -1/2 | 1 | 1 |
| 8 | 1/5 | -1/4 | -1/4 | 1/3 | 1/3 | -1/2 | -1/2 | 1 | 1 |

|   | 7 | 5 | 3 | 1 | 0 | 2 | 4 | 6 | 8 |
|---|---|---|---|---|---|---|---|---|---|
| 7 | 1 | -2/3 | 1/2 | -2/5 | 1/2 | -2/3 | 1 | -2 | Inf |
| 5 | -3/2 | 1 | -3/4 | 3/5 | -3/4 | 1 | -3/2 | 3 | Inf |
| 3 | 2 | -4/3 | 1 | -4/5 | 1 | -4/3 | 2 | -4 | Inf |
| 1 | -5/2 | 5/3 | -5/4 | 1 | -5/4 | 5/3 | -5/2 | 5 | Inf |
| 0 | 2 | -4/3 | 1 | -4/5 | 1 | -4/3 | -5/2 | -4 | Inf |
| 2 | -3/2 | 1 | -3/4 | 3/5 | -3/4 | 1 | -3/2 | 3 | Inf |
| 4 | 1 | -2/3 | 1/2 | -2/5 | -2/5 | -2/3 | 1 | -2 | Inf |
| 6 | -1/2 | 1/3 | -1/4 | 1/5 | -1/4 | 1/3 | -1/2 | 1 | Inf |
| 8 | 0 | 0 | 0 | 0 | 0 | 0 | 0 | 0 | 1 |

METHOD FOR SYNCHRONIZING A RECEIVER WITH A RECEIVED AMBIGUOUS SIGNAL HAVING A KNOWN NUMBER OF AT LEAST TWO PEAKS

CROSS-REFERENCE TO RELATED APPLICATIONS

The present application claims priority under 35 U.S.C. §119(a) of European Patent Application No. EP 10 015 382.4 filed Dec. 7, 2011, the disclosure of which is expressly incorporated by reference herein in its entirety.

BACKGROUND OF THE INVENTION

1. Field of the Invention

The invention is directed to a method of synchronizing a receiver with a received ambiguous signal having a known number of at least two peaks.

2. Discussion of Background Information

In the frame of Radio Navigation Signals, new modulated shape signals have been designed to fulfil new requirements, such as high accuracy, good spectral separation between Signals. Despite their good quality in terms of performance, these new modulations have also introduced new limitations like the ambiguity constraint of the multiple peaks in the auto-correlation function. A synchronization on a wrong peak of the auto-correlation function (ACF) would cause a code delay error, which would itself generate an error in the positioning. The invention will detect any synchronization on a wrong peak and offer the possibility to correct it.

Many techniques have already been proposed to solve this problem:

A first known technique is the Bump Jumping algorithm. In this technique the receiver evaluates the absolute value of the amplitude of two samples of the correlation function which are spaced by N/(2M) chip with respect to the prompt (central) correlator (the N/(2M) values apply for the case of a binary offset carrier BOC(M,N) without filtering). Then the receiver uses the amplitude of these two side peaks, as well as the amplitude of the prompt channel, to verify if the working point of the corresponding tracking loop is effectively well aligned on the central peak of the correlation function and not shifted of one or more sub-carrier symbols (a sub-carrier symbol is equal to N/(2M) chip). In case of an incompatibility between the observed amplitudes and the expected ones, the receiver applies an offset to the replica for correction and to achieve again a perfect alignment. This verification and correction (if needed) can be performed either after each integration period or at a lower rate.

This algorithm shows some limitations as soon as the transmitted signal contains some distortions or when multipath degrade the shape of the auto-correlation function. Indeed, in these cases, the amplitude of the corresponding side peaks of the correlation function can become very close to the amplitude of the central peak (especially true for large M/N ratio and/or relatively low Signal-to-Noise ratio). In that case, a biased comparison of the three correlation peaks would lead to an incorrect decision and to an unnecessary application of an offset to the replica. This would create a large error in the range estimation (several meters). Therefore, the Bump Jumping is restricted to the monitoring of two first side peaks of the ACF and not the complete ACF.

A second known technique is the Double Estimation Technique (DET). The DET consists in implementing an additional tracking loop beside the conventional Delay Lock Loop (DLL) and the Phase Lock Loop (PLL). This loop, called Sub-Carrier Lock Loop (SLL) tracks the sub-carrier embedded in the BOC signal. The sub-Carrier frequency is equal to the chip rate frequency divided by (2M/N for a BOC(M,N) signal). Once the corresponding sub-carrier replica is aligned with the sub-carrier embedded in the received signal, the DET removes it by simple multiplication; this can be considered as a sub-carrier wipe-off. The resulting output of this operation is a signal with a waveform very close to a binary phase shift keying BPSK(N). In that case the DLL will use a BPSK(N) replica to track the corresponding BPSK signal. The favorable property of the corresponding BPSK correlation is that it is unambiguous. However the corresponding peak is not that sharp. Therefore the corresponding tracking performances are worse than those of the SLL which uses a Sub-Carrier Correlation function whose peaks are much narrower (for large M/N ratio). On the other side the correlation function for the sub-carrier replica is multimodal with 2M/N possible stable locking points, and is therefore ambiguous. Hence a complementary exists between the correlation function of the DLL (lower tracking performance but unambiguous) and the SLL (larger tracking performance but ambiguous). The DET then uses the unambiguous correlation function (from the DLL) to correct any offset of the working point of the SLL. The final DET output (range estimation) consequently benefits of the high performances of the SLL and on the ambiguity correction of the DLL.

The DET has been shown to maintain reliable and robust acquisition and tracking in high noise conditions, but the technique may not be as efficient in a real environment (multipath) or in presence of a distorted signal. Indeed both previous effects lead to an asymmetrical BPSK correlation function used by the DLL. If such asymmetries are too large then the correction brought by the unambiguous (and distorted) correlation function for the correction of the SLL might be wrong. This is the possible drawback of the DET algorithm.

A third known technique is the unambiguous tracking structure. This method is very close to the DET algorithm previously described. It consists in generating a correlation function having a single peak which is wider than the central peak of the ambiguous correlation function. A Sub-carrier tracking loop which provides the tracking performance is also implemented. In fact alterative discriminators for the DLL which process this unambiguous correlation function are applied and are different to the discriminator used for the DET. Furthermore, the module which performs the correction of the range estimation provided by the SLL, based on the output of the new DLL is also different. It is possible to determine the threshold for a correction brought to the SLL ranging output, as a function of a specified probability of detection and/or false alarm.

If an ambiguity has been detected, this method has the disadvantage to track on the signal without sub-carrier, which is much more sensitive to multipath and therefore degrades the performances.

A fourth known technique is the Enhanced Sidelobes Cancellation Method. The receiver uses a replica whose waveform is different (not matched) from the waveform of the received signal (BOC(M,N)). The corresponding correlation function shows side-peaks whose amplitude is significantly lower than the side peaks of the ambiguous correlation function that would be derived with the matched (BOC(M,N)) replica. This new correlation function therefore provides a reduced probability of locking onto such side peaks (the ambiguity is thus resolved) and improves the detection performance and correction performance of algorithms like the Bump Jump algorithm.

This method solves the ambiguity, but a correlation loss appears due to the use of a signal replica shape different from the received one.

A fifth known technique is the Binary offset carrier M-code envelope detector that is described in U.S. Pat. No. 7,555,033. This method proposes to create a correlation function presenting a single peak in a different manner than the DET and the "Unambiguous Tracking Structures". This correlation peak is not generated by wiping-off the sub-carrier from the received signal, because this sub-carrier has been successfully tracked by the mean of an SLL. Here the correlation peak is created by combining two correlation outputs: one which is generated with the in-phase and another with the quadrature phase BOC sub-carrier. The non-coherent combination of both correlation outputs provides hence a single and unambiguous peak. This method is also called Sub-Carrier Cancellation.

This method solves the ambiguity. However, its tracking performances are lower than those obtained with the original BOC signal because on one side the correlation peak is wider (smaller time resolution) and on the other side the noise contribution is increased due to the combination of several correlation functions.

In general it can be stated that except for the Bump Jump method all alternative methods try to create an unambiguous correlation peak (Side peak Cancellation, DET, Unambiguous tracking structure and Sub-Carrier cancellation). This one is either used directly for the provision of the range estimation (in case of the Sub-Carrier cancellation method) or used to correct any possible wrong tracking point of the Sub-carrier tracking loop (DET, Unambiguous tracking structure).

SUMMARY OF THE EMBODIMENTS

The problem to be solved by the invention is to provide a fast and reliable method of synchronizing a receiver with a received ambiguous signal.

Embodiments are directed to a method that includes:
a) providing information about a known transmitted signal which has a given number of at least two peaks, the information including the number of peaks and the distance(s) between the at least two peaks;
b) determining the ratios between the peaks of the known transmitted signal and assigning a determined ratio value to each peak;
c) deducting a theoretical auto-correlation function from said known transmitted signal, wherein the auto-correlation function has a number of correlations corresponding to the number of peaks in the known transmitted signal and wherein the correlators of the auto-correlation function are provided in the same distance and have the same relative ratio as the peaks in the known transmitted signal;
d) tracking the received signal with the auto-correlation function so that the correlator pattern of the auto-correlation function is aligned with the peak pattern of the received signal by assigning each peak of the received signal to a correlator of the auto-correlation function;
e) identifying each peak.

The principle is to use additionally extra correlators for the detection of false peak acquisition. The detection will need at minimum the same number of correlators as there are peaks in the auto-correlation function. The invention thus provides a synchronization by using a multi-correlator detector.

It is advantageous if the ratio of each peak is determined as a relation between the respective peak and the maximum peak. Thus, each peak is set in relation to the maximum peak in order to obtain the individual ratio for each peak. This feature provides a peak pattern on the basis of the respective peak ratios which is independent from the absolute values of the peaks.

In order to assign each peak of the received signal to a correlator for the auto-correlation function in step d) it is advantageous to carry out the following steps:
d1) determining the ratios between the peaks of the received signal and
d2) assigning each peak of the received signal to the correlator of the auto-correlation function which has the same ratio value as the peak to be assigned or a value which is closest to said peak.

This comparison of the peak ratio values of the received signal with the correlator ratio values of the auto-correlation function enables a reliable identification of each peak of the received signal even if the received signal is very low.

It is particular advantageous if the assignment of a peak of the received signal to the correlator of the auto-correlation function in step d2) is carried out by comparing the matrix of the peak ratios of the auto-correlation function with the matrix of the peak ratios of the received signal. The result received by this procedure is very reliable.

It is to be understood that both the foregoing general description and the following detailed description of the inventor's method are exemplary and explanatory which are intended to provide further explanation of the invention as claimed.

Embodiments of the invention are directed to a method of synchronizing a receiver with a received ambiguous signal having a known number of at least two peaks. The method includes providing information about a known transmitted signal having a given number of at least two peaks, and the information including the number of peaks and the distances between the at least two peaks, determining ratios between the peaks of the known transmitted signal and assigning a determined ratio value to each peak, deducing a theoretical auto-correlation function from said known transmitted signal. The auto-correlation function has a number of correlations corresponding to the number of peaks in the known transmitted signal and the correlators of the auto-correlation function are provided in the same distance and have the same relative ratio as the peaks in the known transmitted signal. The method also includes tracking the received signal with the auto-correlation function so that the correlator pattern of the auto-correlation function is aligned with the peak pattern of the received signal by assigning each peak of the received signal to a correlator of the auto-correlation function, and identifying each peak.

According to embodiments, the ratio of each peak can be determined as a relation between a respective peak and a maximum peak.

In accordance with other embodiments, in order to assign each peak of the received signal to a correlator of the auto-correlation function in step d), the method may further include determining the ratios between the peaks of the received signal, and assigning each peak of the received signal to the correlator of the auto-correlation function which has the same ratio value as the peak to be assigned or a ratio value which is closest to said peak. Further, assigning a peak of the received signal to the correlator of the auto-correlation function in step d2) may include comparing a matrix of the peak ratios of the auto-correlation function with a matrix of the peak ratios of the received signal.

Embodiments of the invention are directed to a receiver for synchronizing with a received ambiguous signal having a known number of peaks. The receiver may include a digital signal receiver for receiving an ambiguous signal, a first plurality of correlators, including an early, a late, and a punctual correlator, receiving the ambiguous signal and a reference signal, a second plurality of correlators receiving the ambiguous signal and the reference signal, each of the second plurality of correlators being respectively associated with a peak, and a comparison device to compare the ratios of the second plurality of correlators to the reference signal. When the comparison device determines that the ratios are different from the reference signal, a corrector is arranged to correct the ratios to be inline with the reference signal.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The principle of the invention is to use additionally extra correlators for the detection of false peak acquisition. The detection will need at minimum, the same number of correlators as there are peaks in the auto-correlation function. An example of an auto-correlation function (ACF) is presented in FIG. 1 for the signal "Binary Offset Carrier Sinus" BOCs (5,2). The "normalized real CCF" (amplitude in FIG. 1) corresponds to the normalized ACF including the distortions due to payload and receiver, in the illustration, the distortions are not considered, meaning that the CCF equals the CCF. The delay [chip] corresponds to a distance in chip and not in meter.

In this particular case, the application of this method would require nine correlators corresponding to the number of peaks in the ACF. If the receiver is perfectly synchronized, the correlator "0" will track the main peak and the other correlators will monitor for the secondary peaks.

As the transmitted signal is known, its theoretical auto-correlation function can be very easily deduced. The distance between two peaks is then known. Each correlator is associated to a peak; the distance between the correlators corresponds to the distance between the peaks.

To apply this new technique, the principle would be initially to evaluate the ratio between the different correlators located on each of the ACF's peak. The ACF would be characterized at the output of the payload considering the real distortions due to the payload. During the acquisition, pulling and tracking the receiver would have to compare the ratio of the different correlators with the theoretical ones. If the differences of the ratios are higher or lower than a pre-defined threshold, a false peak synchronization will be detected and will be corrected in order to be inline with the theoretical results, knowing that correlator "0" needs to track the central peak.

Figures 1, 2:
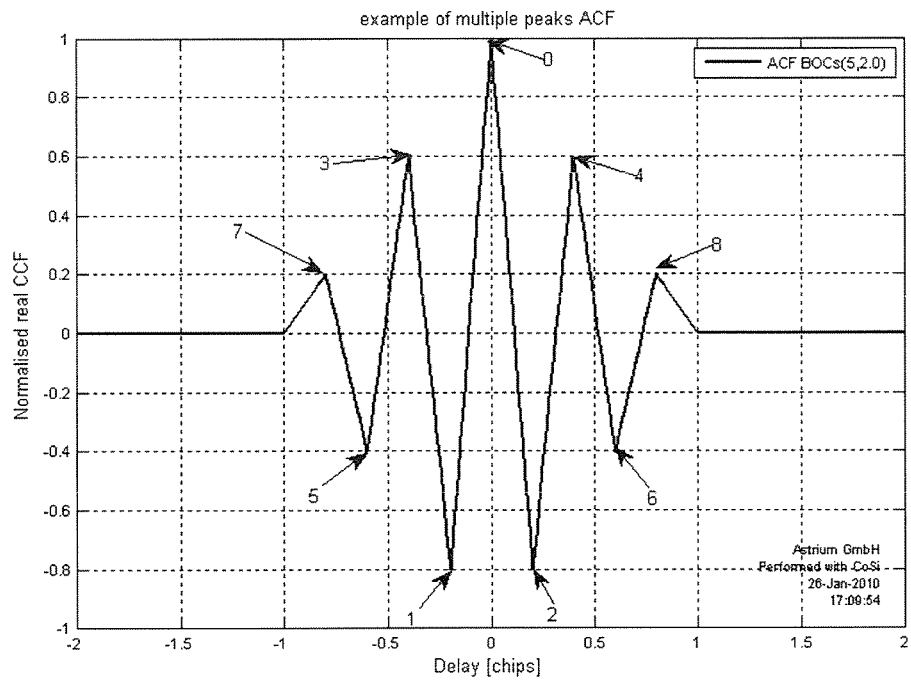
FIG. 1 illustrates a first example of an Auto-Correlation Function (ACF)
FIG. 2 illustrates a table of the evaluation of the ratio between the different peaks in the ACF of FIG. 1.

An example of the evaluation of the ratio between the different peaks are presented in the table of FIG. 2 for the BOCs (5,2) ACF without any distortion.

In the table of FIG. 2, the evaluation of the ratio between the different peaks of the BOCs (5,2) ACF without any distortion is shown as an example. This evaluation is numerically evaluated from the ACF. In this first example, the correlator "0" tracks the main peak. As the payload output signal is well known, the ACF can be evaluated and then the ratio between the peaks of the ACF can be evaluated. The evaluation of the ratio between the different ACF peaks is illustrated in the table in FIG. 2. It is an example done for the signal BOCsinus (5,2).

Figures 3, 4:
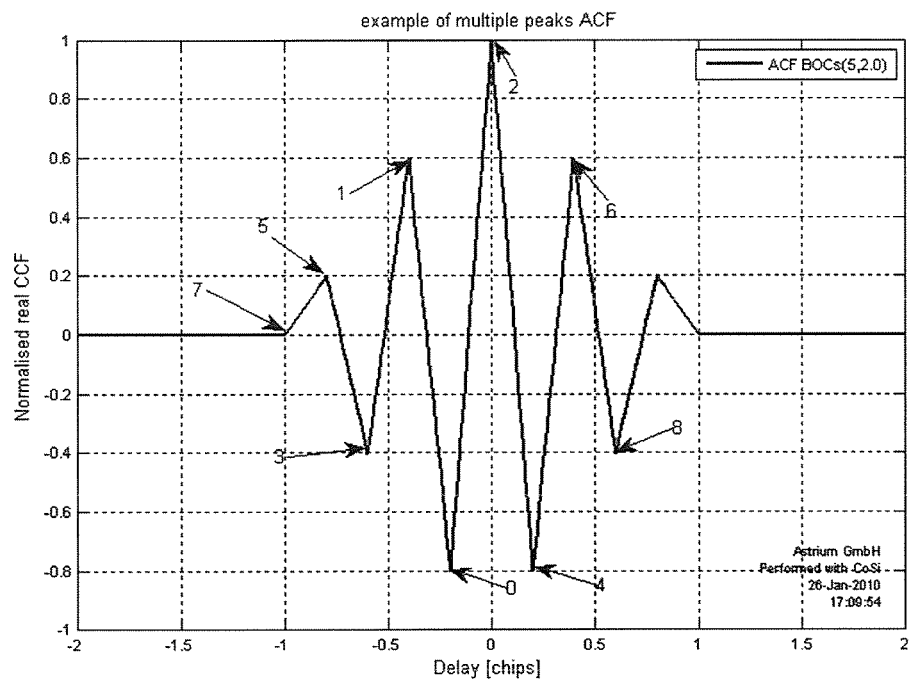
FIG. 3 illustrates a second example of a false acquisition of an Auto-Correlation Function (ACF)
FIG. 4 illustrates a table of the evaluation of the ratio between the different peaks in the ACF of FIG. 3.

An example of a false acquisition is shown in FIG. 3 for the BOC sinus (5,2). The correlator "0" tracks the first secondary peak. In this second example, the correlator "2" tracks the main peak. To detect this false acquisition, the receiver will measure the values obtained for each correlator, and will evaluate the ratio between these values. In that case, the ratios between the different peaks are evaluated. The results are shown in the table of FIG. 4. To clarify the method and to show the symmetry in an easier way, the table is here presented in another order but corresponds exactly to the one presented in FIG. 2.

By comparing the reference matrix, and the matrix evaluated in the receiver, the false peak acquisition can easily be detected. In the table, we observe that the diagonals of the matrix are going "up".

If we define the elements of the matrix by $a_{i,j}$, and the elements of the evaluated matrix $b_{i,j}$, n corresponds to the number of jumps we need to correct the false acquisition. In this case, n=1

$$b_{i,j} = a_{i+n,j+n}$$

$$b_{i,j} = \begin{cases} a_{i+n,j+n} & \text{for } i \neq j_s \\ 1 & \text{for } i = j. \end{cases}$$

Figure 5:
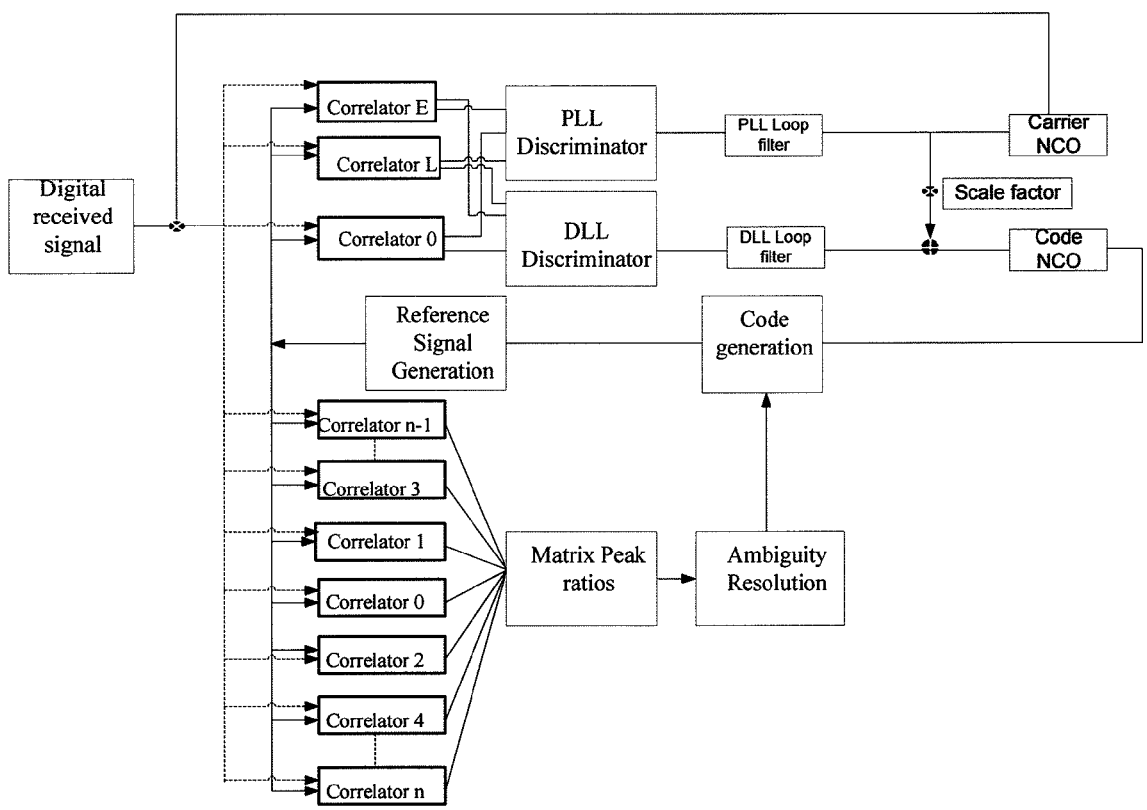
FIG. 5 illustrates a receiver architecture designed to apply the technique according to the present invention.

FIG. 5 shows a receiver architecture designed to apply the so-called "APRE" technique according to the present invention. The receiver architecture is composed of a Delay Lock Loop (DLL) fed by Early, Late, Punctual correlators. Extra correlators can also be used if needed by the Code discriminator (in case of the double-Delta Discriminator). The APRE technique is not dependent on the type of DLL discriminator and could be used as a correction blocks for all possible DLL. The DLL is composed of a DLL loop filter as well as a Code Numerical Controlled Oscillator (NCO). The Phase Lock Loop (PLL) is fed by the punctual correlator "correlator 0". As for the DLL, the APRE technique is not dependent on the PLL discriminator. New types of PLL discriminators could also be used. The PLL is composed of a PLL loop filter as well as a Carrier NCO. It is a standard navigation receiver architecture.

To be able to solve the ambiguity, at least, "n" other correlators are needed. "n" corresponds to the number of secondary lobes present in the ACF. Each of these "n" correlators tracked a secondary. The ratios between the different outputs of the correlators are compared to the theoretical matrix as explained previously. If a wrong peak synchronization is detected by this comparison, the compensation delay necessary to be synchronized to the center peak is transmitted to the code generation.

The advantage of the inventive method is that the distortions of the transmitted signal will not impact the performance as the method uses a referenced ACF considering the payload distortions. The known prior art solutions are more sensitive to these distortions. Due to the high number of information, the probability of a missed detection is very low even in a multi-path environment. The attractive properties about this method are that it uses the properties of the ACF which insures that the acquisition is done on the correct peak, center of the ACF even in a stringent environment.

While the inventive method and the inventive auto-correlator have been described in conjunction with a specific example, it is evident that alternatives, modifications and variations will be apparent to those skilled in the art in light of the foregoing description. Accordingly, it is intended to cover all such alternatives, modifications and variations which fall within the scope of the claims.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:
1. A method of synchronizing a receiver with a received ambiguous signal having a known number of at least two peaks, said method comprising:
   a) providing information about a known transmitted signal having a given number of at least two peaks, and the information including the number of peaks and the distances between the at least two peaks;
   b) determining ratios between the peaks of the known transmitted signal and assigning a determined ratio value to each peak;
   c) deducing a theoretical auto-correlation function from said known transmitted signal, wherein the auto-correlation function has a number of correlations corresponding to the number of peaks in the known transmitted signal and wherein correlators of the auto-correlation function are provided in a same distance and have a same relative ratio as the peaks in the known transmitted signal;
   d) tracking the received signal with the auto-correlation function so that a correlator pattern of the auto-correlation function is aligned with a peak pattern of the received signal by assigning each peak of the received signal to a correlator of the auto-correlation function; and
   e) identifying each peak.

2. The method according to claim 1, wherein the ratio of each peak is determined as a relation between a respective peak and a maximum peak.

3. The method according to claim 1, wherein, in order to assign each peak of the received signal to a correlator of the auto-correlation function in step d), the method further comprises:
   d1) determining the ratios between the peaks of the received signal; and
   d2) assigning each peak of the received signal to the correlator of the auto-correlation function which has the same ratio value as the peak to be assigned or a ratio value which is closest to said peak.

4. The method according to claim 3, wherein assigning a peak of the received signal to the correlator of the auto-correlation function in step d2) comprises comparing a matrix of the peak ratios of the auto-correlation function with a matrix of the peak ratios of the received signal.

5. A receiver for synchronizing with a received ambiguous signal having a known number of peaks, the receiver comprising:
   a digital signal receiver for receiving an ambiguous signal;
   a first plurality of correlators, comprising an early, a late, and a punctual correlator, receiving the ambiguous signal and a reference signal;
   a second plurality of correlators receiving the ambiguous signal and the reference signal, each of the second plurality of correlators being respectively associated with a peak;
   a comparison device to compare ratios of outputs of the second plurality of correlators to ratios of a theoretical signal,
   wherein, when the comparison device determines that the ratios of the outputs are different from those of the theoretical signal, a corrector is arranged to correct the ratios to be inline with the theoretical signal.

* * * * *